United States Patent [19]

DeArkland

[11] Patent Number: 5,425,088
[45] Date of Patent: Jun. 13, 1995

[54] FACE PLATE FOR COIN OPERATED TELEPHONE BOXES

[76] Inventor: James R. DeArkland, 8119 Buena Fortuna, Carpinteria, Calif. 93013

[21] Appl. No.: 212,219

[22] Filed: Mar. 14, 1994

[51] Int. Cl.⁶ .................. H04M 17/00; H04M 1/00; G09F 7/02
[52] U.S. Cl. .................. 379/143; 379/440; 40/611
[58] Field of Search .......... 379/143, 144, 145, 428, 379/437, 440, 447, 451, 459, 453, 441; 52/27.5; 40/336, 337, 338, 339, 611

[56] References Cited

U.S. PATENT DOCUMENTS

| | | | |
|---|---|---|---|
| 4,845,869 | 7/1989 | Martin | 379/453 |
| 5,029,339 | 7/1991 | Caron | 379/453 |
| 5,113,435 | 5/1992 | Chen | 379/441 |

Primary Examiner—Stephen Chin
Assistant Examiner—Kevin Kim
Attorney, Agent, or Firm—Philip D. Junkins

[57] ABSTRACT

An improved outer face plate for the principal section of a coin operated telephone unit. The face plate includes at least one additional face plate opening located proximate a side of the dialing pad area of the plate and defined about its periphery on the backside of the plate by a raised rim for the positioning and support of a front mounted advertising panel card. A back support wall is mounted to the raised rim of the additional plate opening with such wall and the raised rim providing slot openings for the insertion of the front mounted advertising panel card.

4 Claims, 1 Drawing Sheet

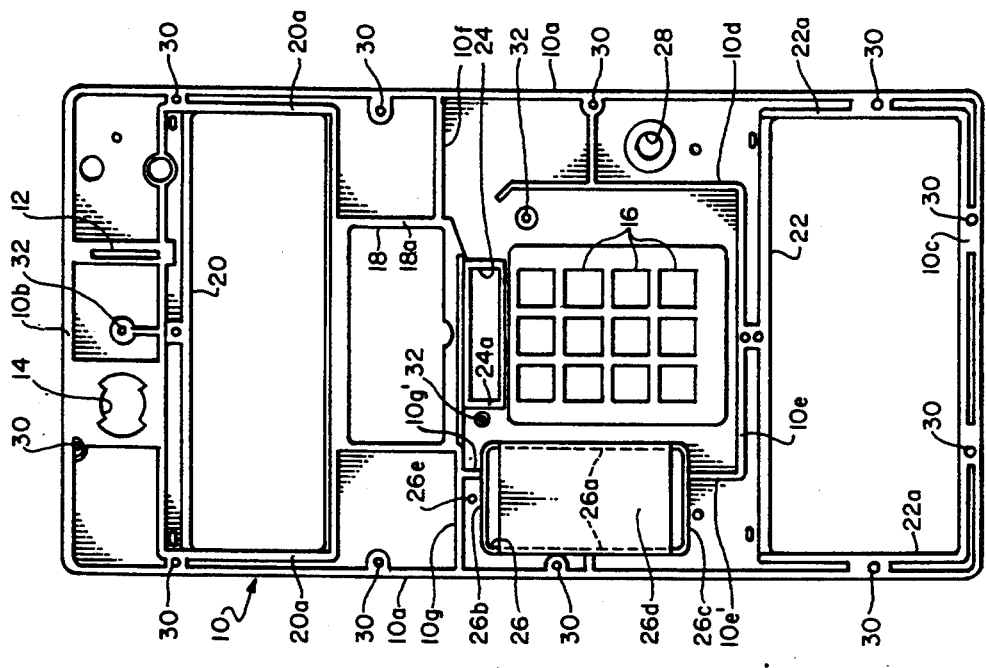
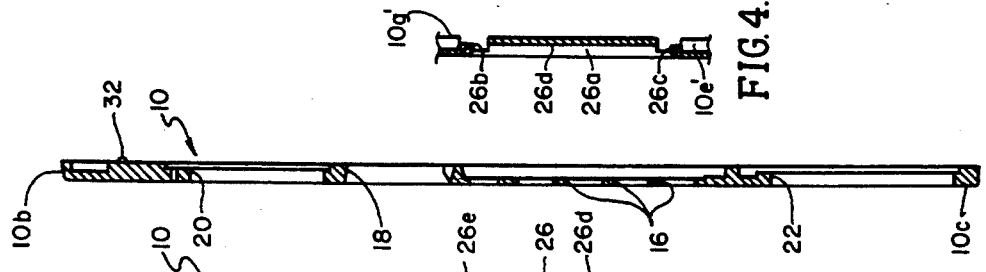
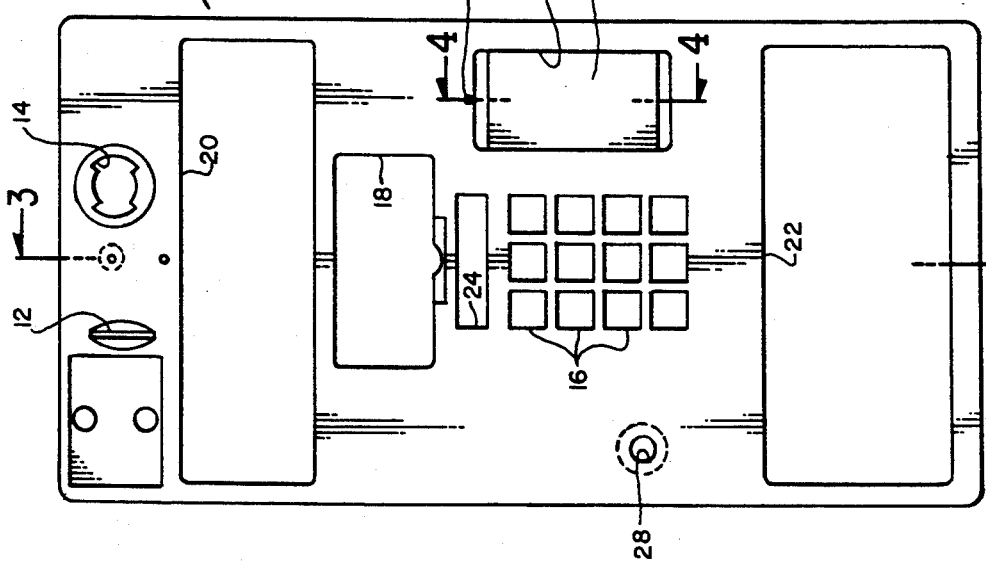

FACE PLATE FOR COIN OPERATED TELEPHONE BOXES

FIELD AND BACKGROUND OF THE INVENTION

The present invention relates to coin operated telephone boxes containing standard coin receiving mechanisms, electronic devices and circuitry, and coin return mechanisms, and with a telephone voice receiving and transmitting instruments or handsets attached via a cable to the boxes. More particularly, the invention relates to coin operated telephone boxes of the type that have: a principal section defined by an outer face plate which includes a coin payment slot, a coin return lever or button, a dialing key pad including dialing buttons or keys, and a telephone handset cradle; and a second section containing a locked compartment within which coins are stored, and a return coin unit including a top pivoted front coin return door.

Coin operated telephone boxes of the type described above have been generally illustrated in U.S. Pat. No. 3,752,927 granted to K. D. Bartley et al, U.S. Design Pat. No. Des. 229,426 granted to G. M. Janda et al, and in U.S. Pat. No. 5,018,193 granted to J. R. DeArkland. It will be noted that the face plates of the principal or upper sections of each of the telephone boxes illustrated in these patents includes a lower rectangular panel area. These panel areas, in the commercially available coin operated telephone boxes, are most frequently used to display telephone operating instructions for local and long distance dialing.

It is a general object of the present invention to provide an improved replacement face plate for the principal section of coin operated telephone boxes which face plate is interchangeable with the original face plate of such boxes and which face plate includes one or more additional information panel areas for dialing information and/or one or more advertising panel areas to promote products and services directly to the pay phone user.

It is a further object of the invention to provide a replacement face plate for the principal sections of public and private pay telephone boxes which includes panel areas for containing and displaying interchangeable advertising information messages relating to available products and services.

Other objects and advantages of the invention will be apparent from the following summary and description of the invention taken together with the accompanying drawing figures.

SUMMARY OF THE INVENTION

The present invention relates to novel interchangeable face plates for the principal section of commercially available coin operated telephone boxes. Such face plates of coin operated telephone boxes, on originally supplied commercial equipment, generally have an upper coin payment slot, an upper port for a coin return lever or button, a centrally located dialing key pad area with openings for the dialing buttons or keys of the telephone apparatus, and means above the key pad area for mounting a telephone handset cradle. Original equipment face plates of coin operated telephone boxes usually include upper and lower rectangular panels used to display telephone operating instructions for local and long distance dialing and a small rectangular panel area directly above the key pad area for display of the telephone number assigned to the box.

The replacement face plates of the present invention include one or more additional information panel areas and/or one or more advertising panel areas to promote products and services directly to the dialing phone user. These additional panel areas are generally of rectangular configuration and are usually located on one side or both sides of the key pad area. Printed interchangeable information and/or advertising cards of appropriate size and shape are insertable into the additional panel areas from the front side of the face plates before or after mounting the face plates to the upper section of the telephone boxes and such cards may be protected from unauthorized removal by appropriately positioned security-type set screws.

BRIEF DESCRIPTION OF THE DRAWING FIGURES

In the accompanying drawing sheet:

FIG. 1 is a front elevation view of a face plate for a coin operated telephone box in accordance with the present invention showing the arrangement of a coin slot, port for a coin return lever or button, centrally located key pad area with openings for the dialing buttons or keys of the telephone apparatus of box, open area above the key pad area for mounting a telephone handset cradle, upper and lower rectangular openings defining panel areas used to display telephone operation instructions for local and long distance dialing, a small rectangular opening directly above the key pad area for display of the telephone number assigned to the telephone box, and a side opening defining an additional information panel area or advertising panel area to promote products and services to the dialing phone user;

FIG. 2 is a rear elevation view of the face plate of FIG. 1 showing the coin slot, coin return lever port, dialing key openings, various information and advertising panel openings, back Fastening points for affixing the face plate to the telephone box, and the means at the periphery of each information and advertising panel area opening for maintaining interchangeable information and advertising cards within such panel areas;

FIG. 3 is a side section view of the face plate of FIG. 1 taken on line 3—3 of FIG. 1; and FIG. 4 is a partial side section view of the additional information panel or advertising panel area of FIG. 1 taken on line 4—4 of FIG.

DETAILED DESCRIPTION OF THE INVENTION

Referring initially to FIG. 1 of the drawing sheet, there is illustrated, in a front elevation view, the replacement face plate 10 for a coin operated telephone box (not shown) in accordance with the present invention. The face plate 10 includes in its upper left corner area a coin slot 12 for the receipt of telephone call payment coins in amounts and number as directed by local call instruction information set forth in a panel area of the face plate or as directed by a telephone system operator handling a call. In the upper right corner area of the face plate there is located a port 14 for a coin return lever or button. A key pad area is centrally located on the face plate with openings 16 for the dialing buttons or keys of the telephone apparatus. Located above the key pad area is an opening 18 through which is mounted a telephone handset cradle (not shown). Elongated rectangular opening 20 (above the cradle opening 18)

and elongated rectangular opening 22 (below the key pad area openings 16) are provided for back mounting of display cards containing telephone operation instructions for local and long distance dialing. A small rectangular opening 24 (located directly above the key pad area openings 16) is provided for back mounting of a card insert bearing the telephone number assigned to the telephone box to which the face plate is mounted.

In accordance with the present invention, and not heretofore incorporated in telephone face plates, there is placed an opening 26 on the right side of the face plate proximate the key pad area openings for the front mounting of an advertising panel card to promote products and services to the dialing phone user. Another opening for a front mounted advertising panel card (not shown) may be positioned on the left side of the face plate proximate the key pad area openings with the opening 28 for the cable leading to the telephone handset moved to a lower position or to the side of the telephone box to which the face plate is mounted.

The reverse or back side of face plate 10 is shown in FIG. 2 with the appropriate location identification of the coin slot 12, port 14 for a coin return lever or button, key pad area openings 16, opening 18 for mounting of the handset cradle of the telephone unit, telephone dialing information panel openings 20 and 22, and opening 24 for the mounting of a panel card bearing the telephone number assigned to the telephone box. The back side of face plate 10 is shown to include raised side rims 10a and top and bottom raised rims 10b and 10c, respectively, for interactive positioning of the face plate at the front opening of the upper section of the telephone box to which the face plate is mounted. Additional raised positioning ridges 10d, 10e, 10f and log are provided which extend over the mid area of the face plate. The upper panel opening 20 and lower panel opening 22 (for the mounting of telephone dialing information cards) are defined, respectively, by raised peripheral rims 20a and 22a and face plate opening 18 (for the handset cradle) and panel opening 24 (for a telephone number display card) are also defined by peripheral rims 18a and 24a, respectively.

The side rims 10a and top and bottom rims 10b and 10c, respectively, include an appropriate number of threaded mounting ports 30 which receive mounting screws from the upper section of the telephone box so as to maintain the face plate 10 to the box. Projecting positioning pins 32 are also provided on the back side of the face plate to assure its proper alignment with the telephone box to which it is mounted. The additional side panel opening 26 for mounting a changeable advertising panel card, in accordance with the present invention, is shown to include raised side rims 26a, raised top and bottom rims 26b and 26c, respectively, and a back support wall 26d (mounted to side rims 26a) whereby an advertising panel card (not shown) may be positioned within opening 26 and supported therein by overlapping engagement with the top and bottom rims 26b and 26c. A threaded hole 26e is provided immediately above rim 26b so that a security-type set screw may be applied through the face plate 10 to interact with the panel card positioned within opening to prevent unauthorized removal of such card.

FIG. 3 is a side section view of the face plate 10 of FIG. 1 taken on line 3—3 of FIG. 1. This section view particularly shows the key pad openings 16, upper dialing information display panel opening 20, lower dialing information display panel opening 22, and opening 18 for mounting of the handset cradle. FIG. 4 is a partial side section view of the additional information panel or advertising panel area of FIG. 1 taken on line 4—4 of FIG. 1. Again, from FIG. 4 it will be apparent that interchangeable advertising panel cards may be inserted from the front side of the Face plate 10 forward of the back support wall 26d with the top and bottom ends of such card supported therein by overlapping engagement with the top and bottom rims 26b and 26c, respectively, of the opening 26. Such an adverting panel card (not shown) is maintained in its centered position in the opening 26 by top end abutment of the card against projection 10g' of raised positioning ridge 10g and bottom end abutment of the card against projection 10e' of the raised positioning ridge 10e and by a security-type set screw applied through threaded hole 26e above the opening 26.

In the specification and drawing figures there has been set forth a preferred embodiment of the invention. It is to be understood that the coin telephone box face plate of the invention may include one or more additional information panel or advertising panel areas positioned on either or both sides of the face plate proximate the key pad area. Although specific terms have been employed to describe the invention, they are used in a generic and descriptive sense only and not for purposes of limitation, the scope of the invention being defined in the following claims.

What is claimed is:

1. In a coin operated telephone unit having:
a principal section defined by an outer face plate including a coin payment slot, a coin return mechanism, a central dialing key pad area having dialing keys, a telephone handset cradle, and dialing information panels; and a second section containing a locked compartment within which coins are stored, and a return coin unit including a top pivoted front coin return door, an improved outer face plate for the principal section of said coin operated telephone unit comprising:
(a) at least one additional face plate opening located proximate a side of the central dialing key pad area of said plate and defined about is periphery on the backside of said plate by a raised rim for the positioning and support of an interchangeable front mounted advertising panel card;
(b) a back supporting wall for said panel card mounted to the raised rim of said additional face plate opening, said wall and said rim providing upper and lower slot openings for the insertion of said front mounted advertising panel card: and
(c) means for applying a security-type set screw through said face plate proximate at least one of said slot openings and positioned to interact with said panel card to prevent unauthorized removal thereof from said face plate.

2. The improved outer face plate for the principal section of a coin operated telephone unit as claimed in claim 1 wherein abutment means are provided on the backside of said face plate proximate the slot openings for insertion of said front mounted advertising panel card to maintain said card in centered position within said additional face plate opening.

3. The improved outer face plate for the principal section of a coin operated telephone unit as claimed in claim 2 wherein the additional face plate opening is rectangular in shape.

4. The improved outer face plate for the principal section of a coin operated telephone unit as claimed in claim 3 wherein the back supporting wall for said panel card mounted to the raised rim of said additional face plate opening is rectangular in shape and is of a vertical length that is less than said opening thereby providing with said rim said upper and lower slot openings for the insertion of said front advertising panel card.

* * * * *